(12) United States Patent
Distelbrink et al.

(10) Patent No.: US 12,470,039 B2
(45) Date of Patent: Nov. 11, 2025

(54) SYSTEM AND TECHNIQUES FOR DIODE LASER WAVELENGTH SPECTRUM NARROWING

(71) Applicant: Xemed LLC, Durham, NH (US)

(72) Inventors: Jan H. Distelbrink, Peabody, MA (US); F. William Hersman, Durham, NH (US); Iulian Constantin Ruset, Exeter, NH (US)

(73) Assignee: XEMED LLC, Durham, NH (US)

( * ) Notice: Subject to any disclaimer, the term of this patent is extended or adjusted under 35 U.S.C. 154(b) by 0 days.

(21) Appl. No.: 18/941,312

(22) Filed: Nov. 8, 2024

(65) Prior Publication Data
US 2025/0158347 A1    May 15, 2025

Related U.S. Application Data

(60) Provisional application No. 63/547,864, filed on Nov. 9, 2023.

(51) Int. Cl.
*H01S 3/227*    (2006.01)
*H01S 3/03*     (2006.01)
(Continued)

(52) U.S. Cl.
CPC .............. *H01S 3/227* (2013.01); *H01S 3/031* (2013.01); *H01S 3/1303* (2013.01); *H01S 3/1392* (2013.01); *H01S 5/141* (2013.01)

(58) Field of Classification Search
CPC ........ H01S 3/227; H01S 3/031; H01S 3/1303; H01S 3/1392; H01S 5/141
See application file for complete search history.

(56) References Cited

U.S. PATENT DOCUMENTS

| 10,348,057 B2 | 7/2019 | Hersman et al. |
| 2009/0174489 A1* | 7/2009 | Aoyama ............... H01S 5/0687 331/94.1 |

(Continued)

OTHER PUBLICATIONS

R. W. Wood, "The Anomalous Dispersion of Sodium Vapour", Philosophical Magazine, 1902, p. 128, 18 pages.

(Continued)

*Primary Examiner* — Yuanda Zhang
(74) *Attorney, Agent, or Firm* — Hayes Soloway PC

(57) ABSTRACT

A diode laser system employing a vapor cell in an external cavity and related techniques are disclosed. The system may be configured to provide high-power, multi-mode output within one or more narrow ranges of wavelengths. A beam emitted from the laser along an initial optical axis passes through a vapor cell, where the effective ground-state occupation density of the vapor is reduced, causing spatial gradients of the vapor's effective index of refraction. Refraction of rays passing through these gradients produces angular deflections, most significantly for rays where the gradients are strongest and for wavelengths whose index of refraction departs furthest from unity near these atomic transitions. An at least partially reflective surface which is not aligned with the initial optical axis but rather is aligned perpendicular to some of these deflected rays provides feedback within an angular range, thereby contributing to the gain of the laser source for these wavelengths.

20 Claims, 10 Drawing Sheets

(51) Int. Cl.
  *H01S 3/13*   (2006.01)
  *H01S 3/139*  (2006.01)
  *H01S 5/14*   (2006.01)

(56) References Cited

U.S. PATENT DOCUMENTS

2018/0205201 A1* 7/2018  Hersman ............... H01S 5/4068
2020/0194955 A1* 6/2020  Rotondaro ............ H01S 5/4043
2024/0372326 A1* 11/2024 Chen ....................... H01S 5/141

OTHER PUBLICATIONS

Andersen et al., "Light guiding light: Nonlinear refraction in rubidium vapor", Physical Review A., The American Physical Society, vol. 63, 023820, 2001, 9 pages.
C. F. McCormick et al., "Saturable Nonlinear Refraction in Hot Atomic Vapor" Physical Review A, The American Physical Society, vol. 69, 023804, 2004, 4 pages.

* cited by examiner

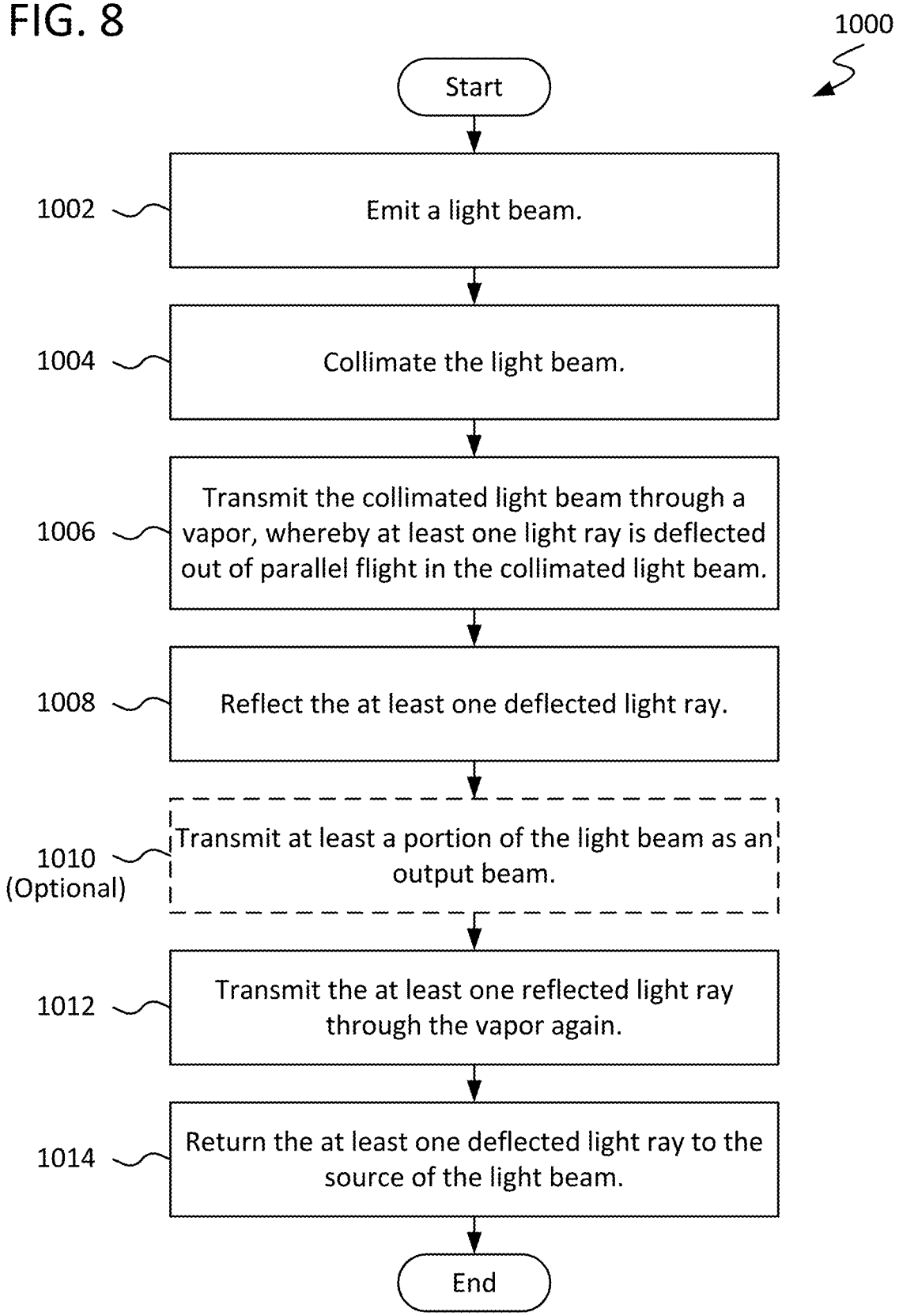

SYSTEM AND TECHNIQUES FOR DIODE LASER WAVELENGTH SPECTRUM NARROWING

CROSS-REFERENCE TO RELATED APPLICATIONS

This patent application claims the benefit of U.S. Provisional Patent Application No. 63/547,864, titled "System and Techniques for Diode Laser Wavelength Spectrum Narrowing," filed on Nov. 9, 2023, which is herein incorporated by reference in its entirety.

FIELD OF THE DISCLOSURE

The present disclosure relates to concentrating the optical power of a diode laser array to a narrow band of wavelengths that lie within the pressure-broadened absorption linewidth of an atomic transition, and more particularly, to optical pumping of an alkali vapor in a low-pressure gas medium.

BACKGROUND

Optical pumping of alkali vapors in buffer gases has demonstrated utility for producing nuclear hyperpolarization of helium-3 ($^3$He) and xenon-129 ($^{129}$Xe), wherein angular momentum is transferred from the circularly polarized photon to the rubidium atomic electron and then collisionally transferred to the noble gas nucleus. The spectral linewidth for photon absorption is on the order of 15-30 picometers, depending on gas pressure. While the efficiency of polarization transfer improves as pressure is decreased, a narrower laser would be needed for utilizing this efficiency. An emerging field of alkali lasers utilizes resonant absorption of D2 pump photons to excite the P3/2 level. Subsequent collisional transitions to the P1/2 level create a population inversion, allowing lasing to the ground state. Again, the spectral linewidth for absorption is much narrower than present technologies can deliver. Pump lasers fitted with volume Bragg gratings (VBGs) reduce the diode's free-running bandwidth of around 3 nanometers to around 0.3 nanometers, centered on the D1 or D2 atomic lines. Attempts at delivering beams with narrower linewidth also require active temperature stabilization of the VBG to avoid thermal drifts away from the atomic line wavelength.

SUMMARY

The subject matter of this application may involve, in some cases, interrelated products, alternative solutions to a particular problem, and/or a plurality of different uses of a single system or article.

A first example embodiment provides a diode laser system. The system includes at least one diode laser source configured for generating at least one beam. The system also includes at least one reflective surface arranged to form, in conjunction with the at least one diode laser source, an external cavity of the system. The system further includes at least one vapor cell disposed within the external cavity between the at least one diode laser source and the at least one reflective surface. In operation of the system: at least a first portion of beam power of the at least one beam is reflected from the at least one reflective surface and again passed through the at least one vapor cell; and deflection of the at least one beam passing through the at least one vapor cell serves to select one or more preferred wavelengths in the external cavity.

In some cases, the first portion of beam power further is directed back towards the at least one diode laser source.

In some cases, the least one diode laser source includes at least one of: at least one multi-mode diode laser source; at least one diode laser bar; at least one diode laser bar stack; and a plurality of diode laser sources. In some instances, the at least one diode laser bar stack includes a plurality of diode laser bar stacks. In some instances, the plurality of diode laser sources is staggered such that beams emitted thereby all remain in focus. In some instances, the plurality of diode laser sources is multiplexed into the external cavity.

In some cases, the at least one diode laser source includes an end diode laser source configured to originate an idler beam, wherein at least one of the at least one diode laser source is configured to originate an output-coupled beam. In some instances, the system further includes at least one beam splitter configured to: provide a portion of beam power from respective beams originated by the end diode laser source and the at least one diode laser source configured to originate the output-coupled beam, respectively, into the external cavity; and provide a portion of beam power originating from the at least one diode laser source configured to originate the output-coupled beam as an output beam.

In some cases, the at least one vapor cell contains at least one of: a vapor of at least one alkali metal species and an isotopic admixture of alkali vapor.

In some cases, in being passed through the at least one vapor cell, the at least one beam undergoes refraction, causing a deflection of light rays, wherein the deflection of light rays is wavelength-dependent.

In some cases, the at least one reflective surface is configured to transmit at least a second portion of beam power of the at least one beam, thereby providing the system with an output beam.

In some cases, the at least one reflective surface is configured such that orientation thereof selects a preferred optical path for the at least one beam.

In some cases, the at least one reflective surface is reflective for a single polarization of the at least one beam incident therewith. In some cases, the at least one reflective surface is reflective for multiple polarizations of the at least one beam incident therewith.

In some cases, the at least one reflective surface is patterned with a series of stripes including: one or more stripes of greater or full reflectivity; and one or more stripes of lesser or no reflectivity.

In some cases, the at least one reflective surface includes one or more reflective portions having one or more surface orientations that form one or more external cavities with the at least one diode laser source.

In some cases, the system further includes at least one lens disposed within the external cavity between the at least one diode laser source and the at least one reflective surface, wherein the at least one lens is configured to focus the at least one beam along at least one dimension.

In some cases, the system further includes an afocal telescope disposed within the external cavity between the at least one diode laser source and the at least one reflective surface, wherein the afocal telescope is configured to image the at least one beam along at least one dimension at the reflective surface. In some instances, the afocal telescope is configured to image the at least one dimension of the at least one beam at the reflective surface after passing through the at least one vapor cell such that deflection in the at least one vapor cell serves to favor one or more wavelengths over other wavelengths in the external cavity.

In some cases, the system further includes at least one polarization-modifying member disposed within the exterior cavity between at least one collimating lens and the at least one reflective surface, wherein the at least one polarization-modifying member includes a half-wave plate.

In some cases, the system further includes at least one beam splitter disposed within the external cavity between the at least one diode laser source and the at least one reflective surface, wherein the at least one beam splitter includes a polarizing beam splitter.

In some cases, the system further includes at least one beam splitter disposed within the external cavity between the at least one diode laser source and the at least one reflective surface, wherein the at least one beam splitter includes a non-polarizing beam splitter.

In some cases, the system further includes at least one beam splitter disposed within the external cavity between the at least one diode laser source and the at least one reflective surface, wherein the at least one beam splitter is patterned with a series of stripes including: one or more stripes of greater or full reflectivity; and one or more stripes of lesser or no reflectivity.

In some cases, the system further includes at least one beam splitter disposed within the external cavity between the at least one diode laser source and the at least one reflective surface, wherein the at least one diode laser source includes at least two diode laser sources; and the at least one beam splitter includes at least two beam splitters disposed within the external cavity between the at least two diode laser sources, respectively, and the at least one vapor cell.

A second example embodiment provides a high-power diode laser system. The system includes at least one multi-mode diode laser emitter for generating at least one beam propagating along an initial optical path. The system also includes at least one reflective surface whose orientation is not perpendicular to the initial optical path. The system further includes at least one vapor cell located within an external cavity of the system between the at least one multi-mode diode laser emitter and the at least one reflective surface. For this system, a gradient in an effective index of refraction of the vapor arises due to passage of the at least one beam through the at least one vapor cell. Also, at least some rays constituting some power of the at least one beam are deflected in the gradient. Additionally, the at least some rays so deflected impinge along a path perpendicular to the at least one reflective surface and, upon reflection, are fed back through the at least one vapor cell along a bent path to the at least one multi-mode diode laser emitter. Furthermore, the system thereby allows for a range of preferred wavelengths to be selected by the external cavity for amplification by the at least one multi-mode diode laser emitter.

A third example embodiment provides a method. The method includes: emitting a beam; collimating the beam; transmitting the collimated beam through a vapor, whereby at least one light ray is deflected out of the collimated beam; reflecting the at least one deflected light ray; transmitting the at least one reflected light ray through the vapor; and returning the at least one deflected light ray to a source of the beam.

In some cases, emitting the beam involves a diode laser source.

In some cases, returning the at least one deflected light ray to the source of the beam involves passing the at least one deflected light ray through a collimating lens utilized in collimating the beam.

In some cases, transmitting the at least one reflected light ray through the vapor involves passing the at least one reflected light ray through a vapor cell containing the vapor utilized in transmitting the collimated beam.

In some cases, reflecting the at least one deflected light ray involves a reflecting surface.

In some cases, the method further includes transmitting at least a portion of the beam as an output beam. In some such instances, transmitting at least a portion of the beam as the output beam involves a reflecting surface.

A fourth example embodiment provides a method for wavelength-locking and spectral narrowing a high-power diode laser. The method includes generating at least one beam propagating along an initial optical path. The method also includes positioning at least one reflective surface along a path of the at least one beam and orienting the at least one reflective surface in a direction that is not perpendicular to the initial optical path. The method additionally includes disposing at least one vapor cell within an external cavity between at least one diode laser source and the at least one reflective surface so that the at least one beam passes therethrough. The method further includes producing gradients in an effective index of refraction of the vapor, which arise according to spatial variations in intensity of the at least one beam. Also, the method includes deflecting, in one or more of the gradients, at least some rays constituting some power of the at least one beam. Additionally, the method includes orienting the at least one reflective surface perpendicular to at least one of the at least some deflected rays. In addition, the method includes reflecting one or more of the at least some deflected rays back through the at least one vapor cell along an original bent path to return to the at least one diode laser source. Furthermore, the method includes causing one or more preferred wavelengths to be selected by the external cavity for amplification by the at least one diode laser source.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 8 is a flow diagram illustrating a method of diode laser wavelength spectrum narrowing in accordance with an embodiment of the present disclosure.

Figure 1A:
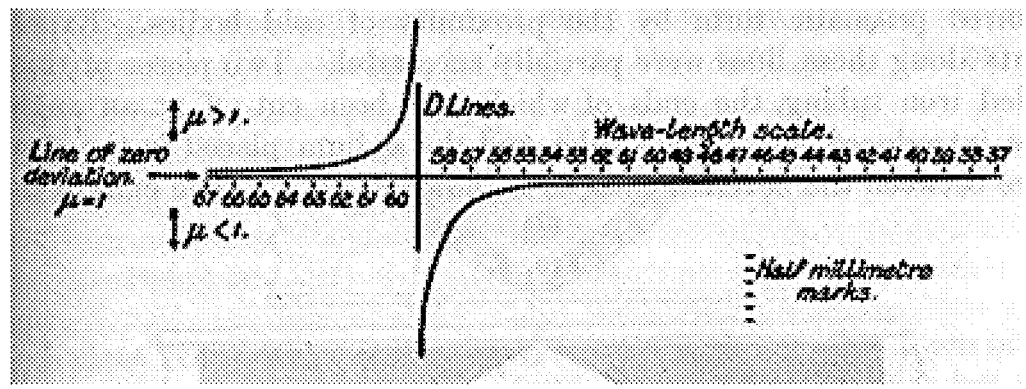
FIG. 1A is a graph illustrating anomalous dispersion of sodium vapor measured by deflection of rays through a vapor cell with a concentration gradient maintained by diffusive transport.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

A diode laser system employing a vapor cell in an external cavity and related techniques are disclosed. In accordance with some embodiments, the disclosed system may be configured to provide high-power, multi-mode output within one or more narrow ranges of wavelengths. A beam emitted from the laser along an initial optical axis passes through a vapor cell, where the effective ground-state occupation density of the vapor is reduced, for example, by light-induced quantum coherence between the atom's ground and excited state, causing spatial gradients of the vapor's effective index of refraction. Refraction of rays passing through these gradients produces angular deflections through the vapor cell, most significantly for rays where the gradients are strongest and for wavelengths whose index of refraction departs furthest from unity near these atomic transitions. A surface that is at least partially reflective which is not aligned with the initial optical axis of the beam but rather is aligned perpendicular to some of these deflected rays provides feedback within an angular range, thereby contributing to the gain of the laser source for these wavelengths. Rays traversing paths outside this range, including those propagating along the initial optical axis of the beam that are not deflected, do not benefit from feedback. An afocal telescope in one or both dimensions may be employed to concentrate illumination from the diode laser source(s) at the reflective surface(s) terminating the external cavity. Numerous configurations and variations will be apparent in light of this disclosure.

General Overview

One known high-power laser system uses an external cavity containing a cell with a vapor to use the vapor's optical activity to lock the sources to the transition wavelength. Atomic line filters (ALFs) provide passbands of a few picometers and have been used to improve the background rejection of conventionally filtered laser receivers. In general, ALFs make use of narrow, sharp features in the spectra of atomic vapors (e.g., alkali metal vapors) to provide ultra-narrow optical passbands. U.S. Pat. No. 10,348,057, the disclosure of which is herein incorporated by reference in its entirety, teaches using a specific ALF, a Faraday anomalous dispersion optical filter (FADOF), in the external cavity of a plurality of diode lasing elements to create feedback within a narrow passband of the D1 and/or D2 atomic line of rubidium.

Although the FADOF feedback narrowing system and method perform well for laser power levels that range from very low up to modest laser power, at increasingly higher power, the intensity incident on the optical cell can modify the effective ground state density of the vapor cell. This can drive the coherence between the atomic levels to saturation, reducing the FADOF performance, thereby limiting the laser power that can be produced. As such, there is need for a system and techniques that (a) utilize the vapor cell in an external cavity to select wavelengths near an atomic transition for feedback, thereby locking the laser wavelength and narrowing its spectral width but (b) do not lose their locking efficiency at high laser power.

Thus, and in accordance with some embodiments, a diode laser system employing a vapor cell in an external cavity and related techniques are disclosed. In accordance with some embodiments, the disclosed system may be configured to provide high-power, multi-mode output within one or more narrow ranges of wavelengths. A beam emitted from the laser along an initial optical axis passes through a vapor cell, where the effective ground-state occupation density of the vapor is reduced, for example, by light-induced quantum coherence between the atom's ground and excited state, causing spatial gradients of the vapor's effective index of refraction. Refraction of rays passing through these gradients produces angular deflections through the vapor cell, most significantly for rays where the gradients are strongest and for wavelengths whose index of refraction departs furthest from unity near these atomic transitions. A surface that is at least partially reflective which is not aligned with the initial optical axis of the beam but rather is aligned perpendicular to some of these deflected rays provides feedback within an angular range, thereby contributing to the gain of the laser source for these wavelengths. Rays traversing paths outside this range, including those propagating along the initial optical axis of the beam that are not deflected, do not benefit from feedback. An afocal telescope in one or both dimensions may be employed to concentrate illumination from the diode laser source(s) at the reflective surface(s) terminating the external cavity.

In accordance with some embodiments, the disclosed system may be provided with an "in-line" or "straight through" configuration, which terminates the external cavity using a partially reflective surface, to feed a portion of the beam power back along the bent path through the external cavity and to provide one or more output beams. In accordance with some embodiments, the disclosed system may be provided with a "splitter" or "power divider" configuration, in which a highly reflective surface terminates the external cavity while one or more beam splitters between the diode laser source(s) and the external cavity provide the one or more output beams. In accordance with some embodiments, the disclosed system may include multiple diode laser sources, such as multiple diode laser bar stacks, providing multiple output beams.

In accordance with some embodiments, the disclosed system and techniques may exploit a cell filled with atomic vapor whose transition lies near the desired wavelength as a multi-mode bandpass filter to select only those wavelengths for feedback. A laser beam passing through a vapor cell with a wavelength sufficiently close to an atomic transition may establish a quantum coherence between the two states of the transition, effectively depleting the ground-state occupation, thereby decreasing the optical thickness. The spatial variation in beam intensity within the beam profile establishes a spatially dependent optical thickness of the vapor. With sufficient optical beam power, the change in optical thickness of the vapor from the edge to the center of the beam multiplied by the index of refraction of that wavelength in the vapor can serve to deflect some portion of the beam's edge rays due to refraction. Orientation of the one or more optical surfaces perpendicular to one or more of these bent trajectories selects one or more wavelength ranges for high-gain feedback to the multi-mode diode laser source. As will be appreciated in light of this disclosure, the disclosed system and techniques can serve, in accordance with some embodiments, as an alternative to the prior FADOF-based approach noted above, offering practical benefits such as higher locking efficiency at higher laser beam intensities.

In accordance with some embodiments, the disclosed diode laser system may include at least one multi-mode diode laser source configured for generating at least one beam propagating along an initial optical-axis direction and at least one surface that is at least partially reflective with an orientation that is not perpendicular to that initial direction of propagation. At least one vapor cell may be located between the at least one diode laser source and the reflective surface. In at least some cases, this system may be energized at a preferred choice of diode current, favoring a preferred optical beam power. Along its path through the cell, the preferred beam intensity and wavelength may deplete the effective density of the atomic ground state, for example, by establishing a quantum coherence between the ground and excited states, thereby establishing a spatially varying optical thickness, which, combined with the wavelength's index of refraction, may cause at least some portion of the beam to traverse an optical path that is deflected while passing through the vapor cell. Orienting the at least partially reflective surface perpendicular to at least one of these deflected rays may feed at least a portion of the beam's power back along the bent path through the external cavity back to the laser source. Thus, in this example case, the system and related techniques may select the one or more preferred wavelengths for gain, which may come to dominate the wavelength content of the entire laser beam, in accordance with some embodiments.

In accordance with some embodiments, the disclosed diode laser system may include a plurality of diode laser sources, each fitted with a fast-axis collimating lens, configured for generating a plurality of beams, respectively, propagating along an initial optical axis direction. One or more reflective surfaces having orientation(s) that are not perpendicular to this optical axis may be included. At least one vapor cell may be located within the external cavity between the plurality of diode laser sources and the reflective surface(s) such that the plurality of beams may pass through the vapor cell. Each beam's edge rays may deflect due to refraction as they traverse the spatially dependent optical thickness of the vapor. Orientation(s) of the one or more reflective surfaces at the end of the external cavity may select one or more narrow ranges of wavelengths for gain.

In accordance with some embodiments, a wavelength-selective external cavity assembly may be provided for the disclosed diode laser system. The high-power diode laser sources may be configured so that their beams propagate along an initial optical axis direction. The external cavity assembly may include one or more reflective surfaces with orientation(s) that may not be perpendicular to the initial optical axis direction. An afocal telescope having lenses that converge along one or both axes may be located within the external cavity between at least one diode laser source and the reflective surface and configured to image at least one dimension (e.g., slow-axis, fast-axis, or both) of at least one beam at the reflective surface. At least one vapor cell may be located within the external cavity between the at least one diode laser source and the reflective surface. The beam's passing through the vapor cell may cause deflections of some rays of the beam, at least one of which may reflect from the reflective surface and be fed back along its bent path to the source, serving for wavelength selection in the external cavity.

System Architecture and Operation

In accordance with some embodiments, a high-power diode laser system 10 (see FIG. 4, discussed below) may employ a vapor cell enclosing a vapor of one or more atomic species to select one or more wavelength bands close to an atomic transition for feedback to emitters 100, thereby providing a high-power beam especially suitable for optical pumping of one or more atomic species in a low-pressure gaseous medium.

Figure 1B:
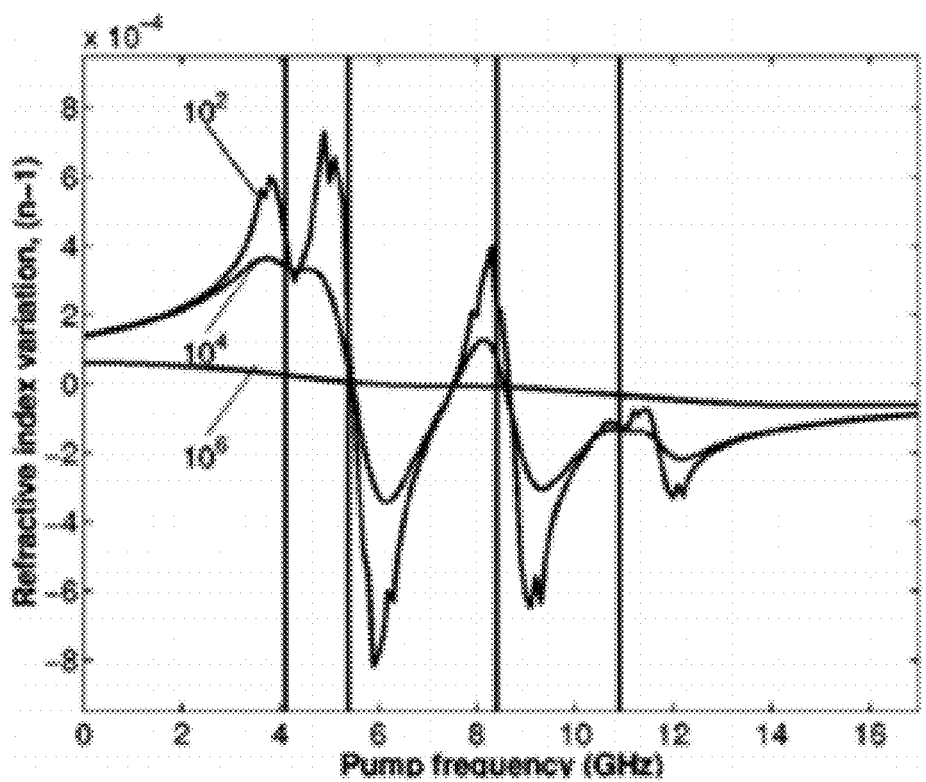
FIG. 1B is a graph illustrating measurements of index of refraction reduction in rubidium vapor in the presence of intense optical pumping.
Figure 1C:
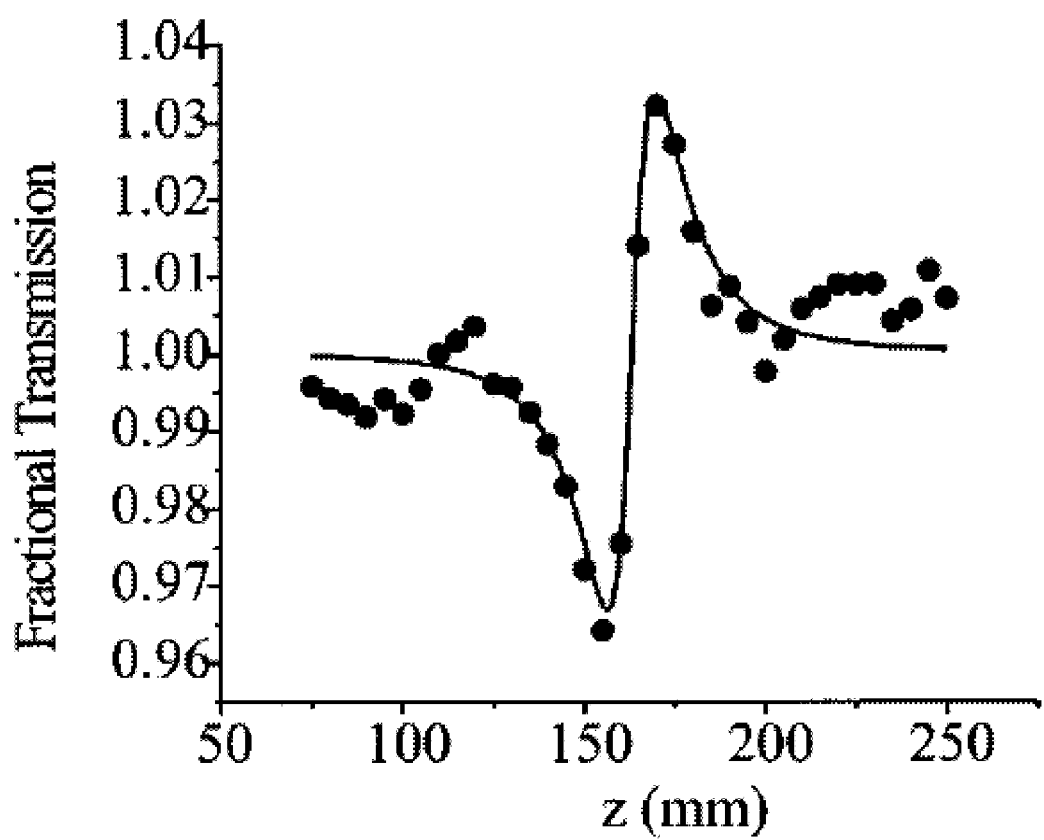
FIG. 1C is a graph illustrating the Kerr effect, saturable non-linear refraction of wavelengths near transitions in hot rubidium vapor, via a scan of fractional transmission through a pinhole of a diffraction-limited beam emerging from a pinhole, focused by a lens, and directed through a vapor cell, as a function of distance between the pinholes (z-scan), showing the focusing of wavelength with detuning delta=0.8 GHz from the $^{85}$Rb F=3 to F' transition.

Referring to FIG. 1A, measurement of anomalous dispersion was reported by R. W. Wood in 1901, in which a gradient in alkali vapor density, specifically sodium, was shown to deflect beams of different wavelengths by several millimeters, particularly in the vicinity of the D-line transitions. Referring to FIG. 1B, Anderson et al. measured a nonlinear reduction in the index of refraction of an alkali vapor in the presence of intense light near the D-line atomic transitions of rubidium. This effect is due to a quantum coherence between the ground state and the excited level induced by the electromagnetic wave, thereby reducing the effective density of ground-state atoms. Referring to FIG. 1C, McCormick et al. provide quantitative measurements of non-linear refraction in hot atomic vapor, extracting the Kerr coefficient, the strength of focusing of wavelengths that are shorter than that of the rubidium D2 transition. As discussed herein, system 10 may be configured to exploit one or more of these phenomena, in accordance with some embodiments.

Figure 2:
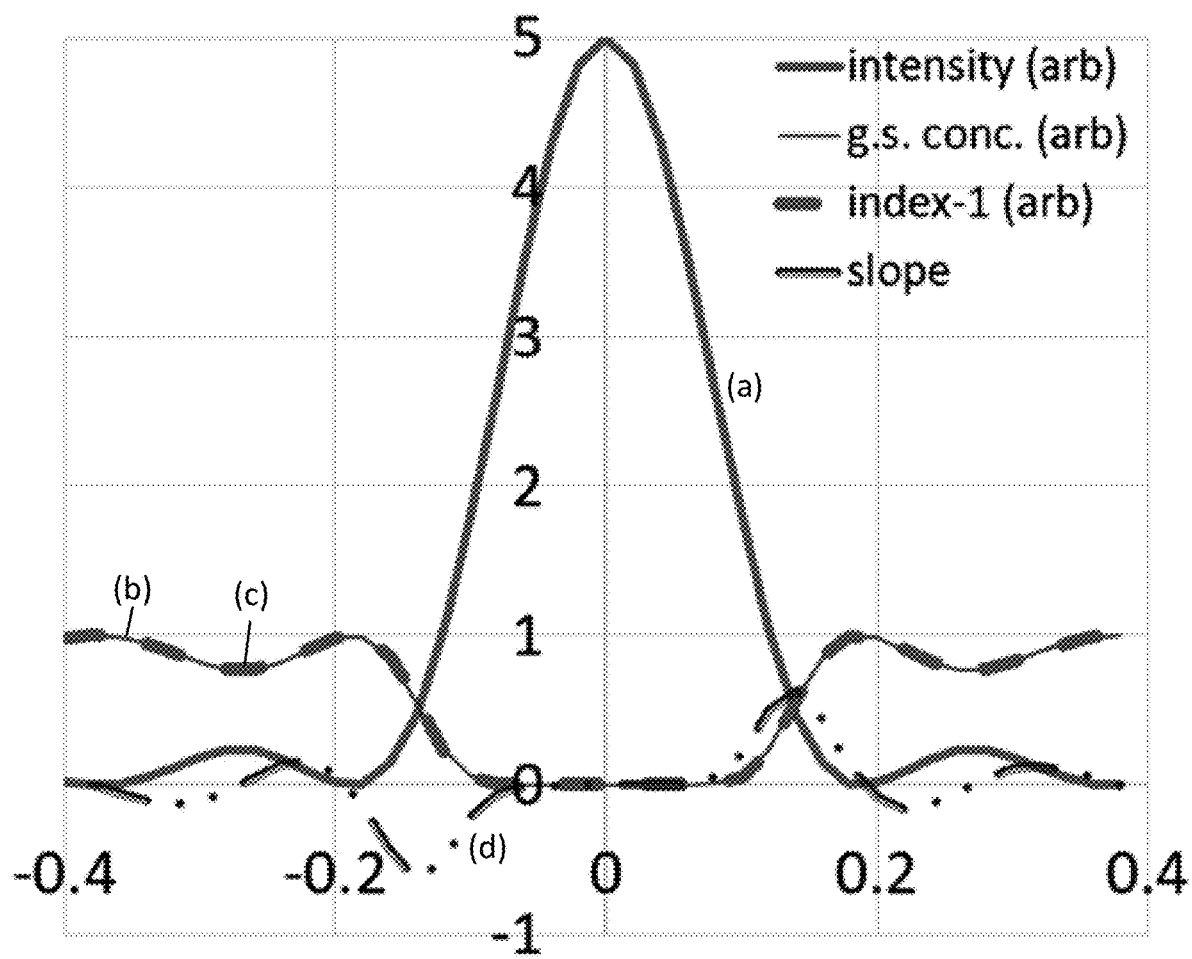
FIG. 2 is a graph illustrating plots of (a) an intensity profile of a diffraction-limited laser beam collimated by a fast-axis collimating lens plotted against the fast-axis coordinate, (b) a schematic depiction of the highest intensity depicted in the center of the intensity profile, (c) a schematic depiction of index of refraction, which is reduced within the center of the beam where quantum coherence depletes the ground-state occupation probability, and (d) a schematic depiction of deflection angle represented as the slope of plot (c).

Referring to FIG. 2, a schematic model of these phenomena is calculated for a diffraction-limited beam emerging from a slit, whose intensity profile follows $\sin(x)^2/x^2$. This is shown in plot (a) (the blue, solid curve). It is hypothesized that the highest intensity depicted in the center of the intensity profile is sufficient to drive the effective optical thickness nearly to zero. This is shown in plot (b) (the red, solid curve). In the region of reduced optical thickness, the effective index of refraction (e.g., index of refraction for a given wavelength in the vapor multiplied by the areal thickness of ground-state atoms) is driven nearly to unity, while the lower intensity far from the center induces a lesser reduction in the effective index of refraction. This is shown in plot (c) (the orange/gold, dashed curve). The spatial change in effective index of refraction of the vapor from the center to the edge of the beam, which is steepest near the edge of the central portion where the intensity is steeply falling, can induce a deflection of some rays. This is shown in plot (d) (the gray, dot-dot-dash curve).

Figure 3A:
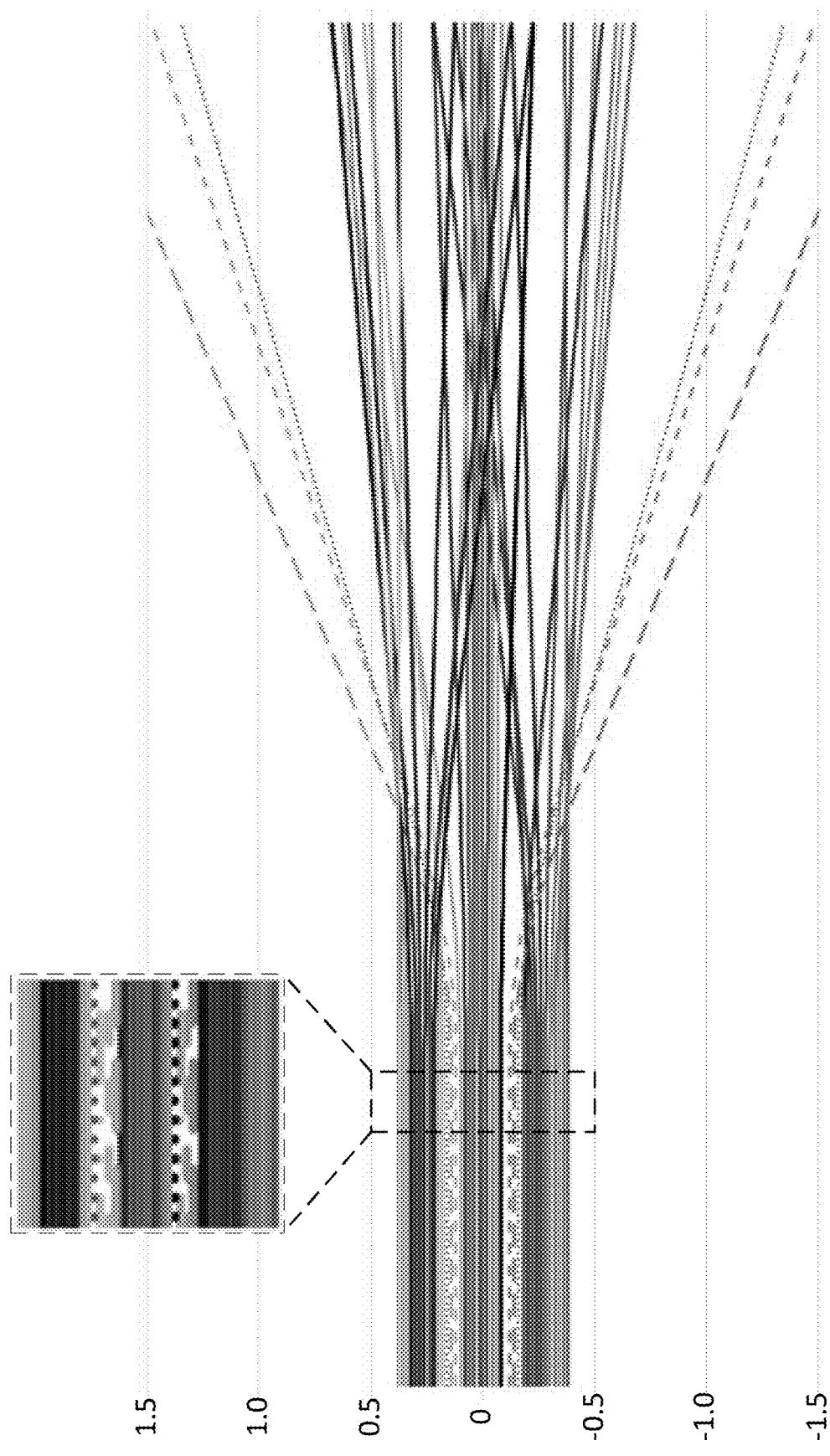
FIG. 3A is a schematic depiction of light rays entering a vapor cell and being deflected by a positive angle in proportion to the positive gradient of the index of refraction represented in plot (b) of FIG. 2, representing possible trajectories of wavelengths that are longer (red-shifted) than the resonant line(s), in accordance with an embodiment of the present disclosure.

FIG. 3A is a schematic depiction of light rays entering a vapor cell and being deflected by a positive angle in proportion to the positive gradient of the index of refraction represented in plot (b) of FIG. 2, representing possible trajectories of wavelengths that are longer (red-shifted) than the resonant line(s), in accordance with an embodiment of the present disclosure. FIG. 3A schematically depicts the influence of the above schematic model on rays within a collimated beam propagating through a vapor cell (not shown), where (a) some rays lie in the central, high-intensity region, (b) some rays lie well outside the center of the beam where the beam intensity is low, and (c) some rays lie in the region where the intensity is steeply falling. Considering only wavelengths longer than that of the transition, the effective index of refraction is greater than unity. Where it is spatially changing, it increases from the beam center to both edges. Rays that are deflected the most have been highlighted by representing them with dashes and dots. Tracing these rays to their origin confirms that the rays in the region where the effective index of refraction is changing are bent most strongly. An inset with expanded view in FIG. 3A assists in identifying these regions. For normal (e.g., greater than unity) index of refraction, rays are bent towards the direction with higher effective density of ground-state atoms, the region with larger effective index of refraction (e.g., away from the center of the beam). Due to anomalous dispersion of wavelengths that lie in the vicinity of the atomic transition, wavelengths that are longer (e.g., redder) than the wavelength of the transition have an effective index of refraction greater than unity. Regarding FIG. 3A, note that the light rays at the edge of the central region are bent outward the most (e.g., defocused).

Figure 3B:
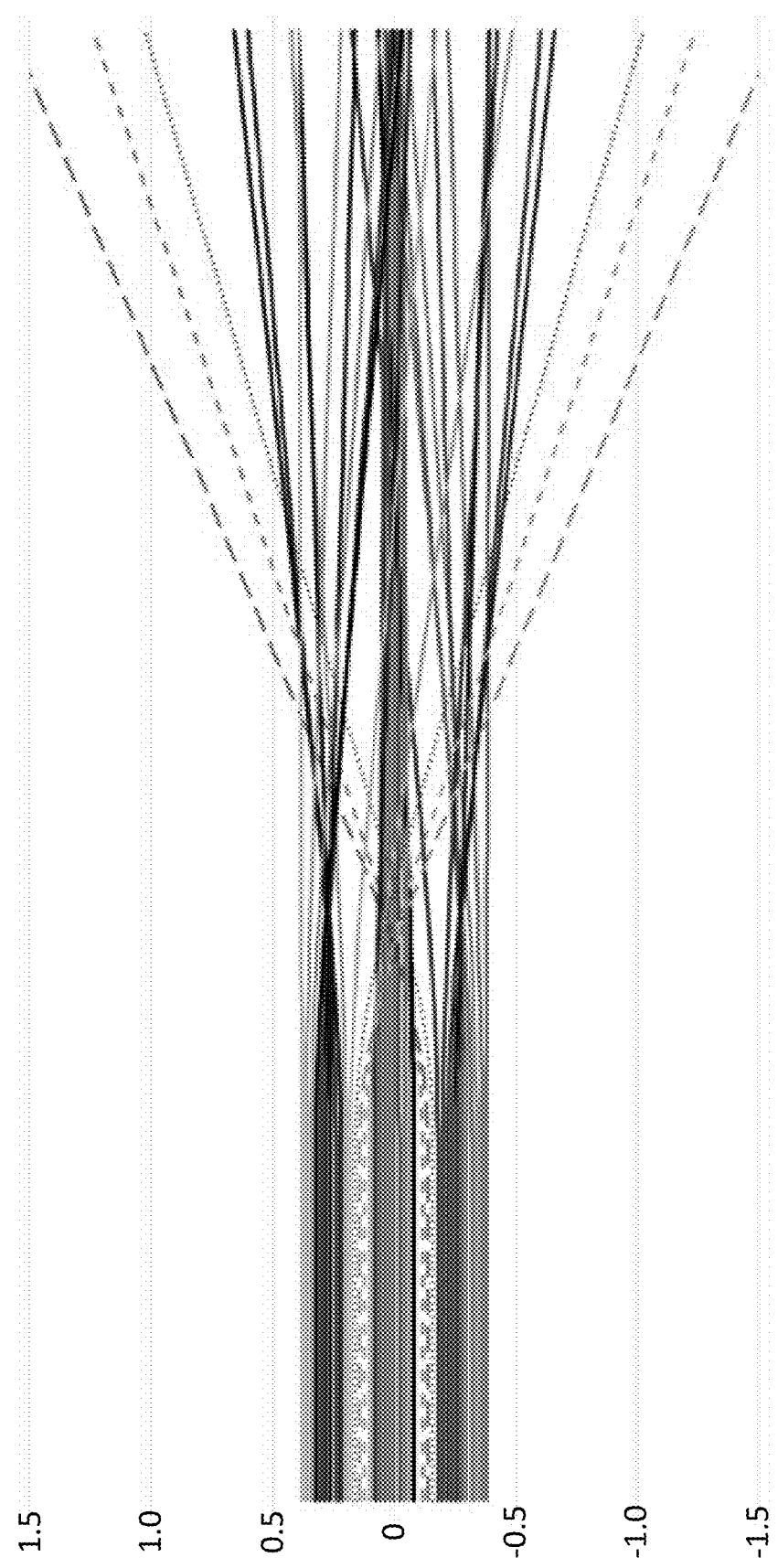
FIG. 3B is a schematic depiction of light rays entering a vapor cell and being deflected by a negative angle in proportion to the positive gradient of the index of refraction represented in plot (b) of FIG. 2, representing possible trajectories of wavelengths that are shorter (blue-shifted) than the resonant line(s), in accordance with an embodiment of the present disclosure.

Wavelengths that are shorter (e.g., bluer) than the wavelength of the transition have an index of refraction less than unity, causing such rays to bend away from the regions with greater effective density. FIG. 3B is a schematic depiction of light rays entering a vapor cell and being deflected by a negative angle in proportion to the positive gradient of the index of refraction represented in plot (b) of FIG. 2, representing possible trajectories of wavelengths that are shorter (blue-shifted) than the resonant line(s), in accordance with an embodiment of the present disclosure. FIG. 3B schematically depicts the influence of the above schematic model on rays within a collimated beam propagating through a vapor cell (not shown), where (a) some rays lie in the central, high-intensity region, (b) some rays lie well outside the center of the beam where the beam intensity is low, and (c) some rays lie in the region where the intensity is steeply falling and the effective index of refraction is less than unity and spatially changing, decreasing from the beam center to both edges. For anomalous (e.g., less than unity) index of refraction, rays are bent away from the direction with higher effective density of ground-state atoms, the region with index of refraction further lower than unity (e.g., toward the center of the beam). Rays that are deflected the most have been highlighted by representing them with dashes and dots.

Tracing these rays to their origin confirms that the rays in the region where the effective index of refraction is changing most rapidly are bent most strongly. Indeed, they are the same rays as in the previous case depicted in FIG. 3A, but bent in the opposite direction. Regarding FIG. 3B, note that the light rays at the edge of the central region are bent inward the most (e.g., focused).

Figure 4:
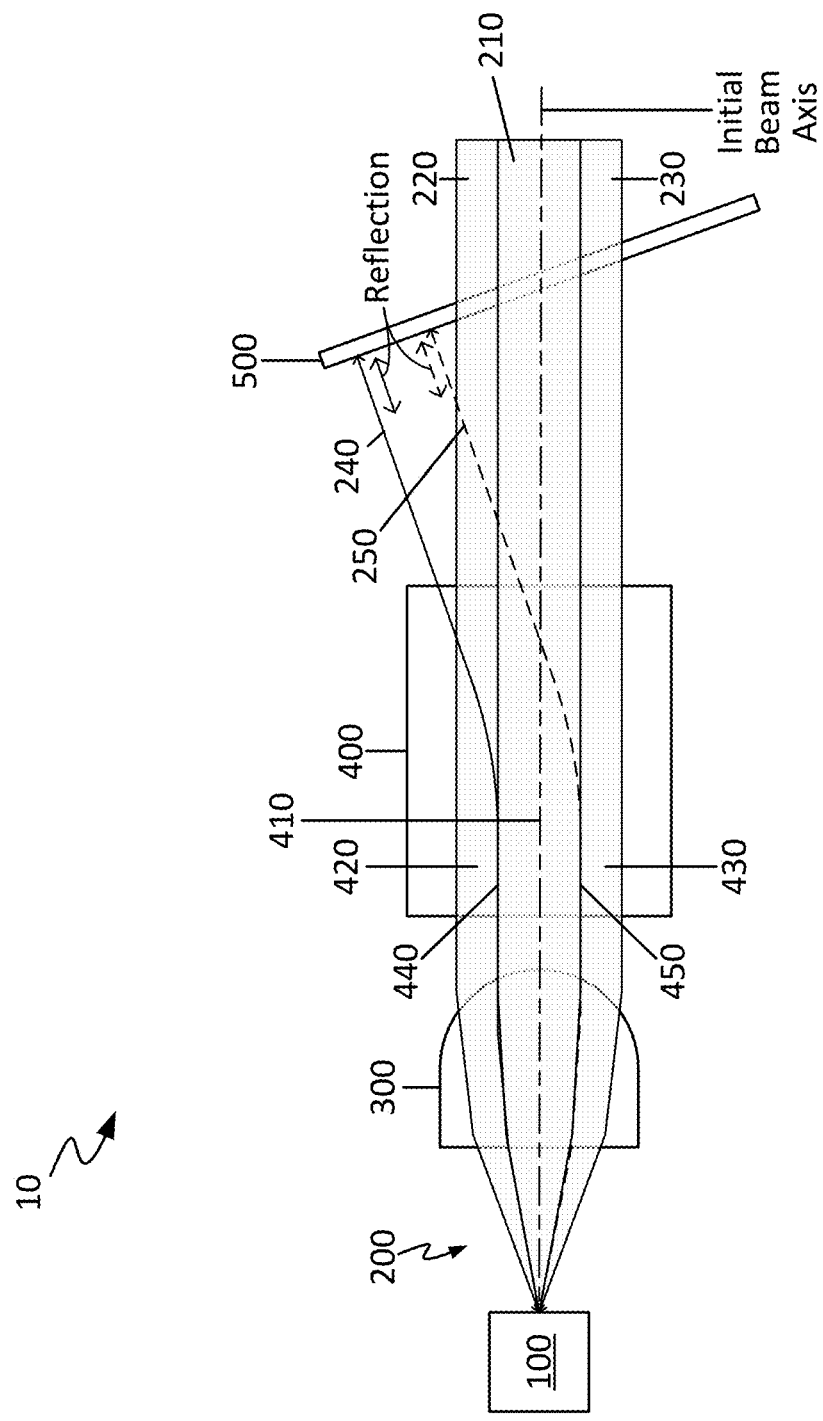
FIG. 4 is a schematic diagram of a diode laser system configured in accordance with an embodiment of the present disclosure.

Such schematic principles become evident when examining a depiction of the disclosed system 10. FIG. 4 is a schematic diagram of a diode laser system 10 configured in accordance with an embodiment of the present disclosure. As can be seen from FIG. 4, system 10 may include one or more diode laser sources 100, a collimating lens 300, a vapor cell 400, and a reflective surface 500. As generally shown in FIG. 4 and discussed herein, collimated beam 200 is depicted with (a) an intense central region, (b) an outer region of lesser intensity, and (c) light ray(s) propagating therein which refract in vapor cell 400 towards an off-angle reflective surface 500, thereby selecting a range of wavelengths near an atomic line. Further detail is provided below.

In operation of system 10, a given diode laser source 100 may be configured to emit a beam 200 having (1) diverging rays with intensity along the fast-axis according to a diffraction-limited distribution and (2) diverging rays along the slow axis (e.g., out of the drawing page) that are diverging more slowly. A collimating lens 300 (e.g., fast-axis collimating lens) may be placed at a distance from that diode laser source 100 to cause beam 200 to be collimated, with its central axis placed directly in front of that diode laser source 100 so that beam 200 emerging from lens 300 is collimated. The central plane of beam 200 along the fast-axis direction may have an intersection with the plane centered along the slow axis, the intersection of these two planes defining an initial optical axis. Collimated beam 200 may have (a) a central region 210 where the intensity is greatest and (b) a peripheral region above 220 and below 230 the central plane where the intensity is significantly lower.

In operation of system 10, beam 200 may be directed toward a sealed vapor cell 400 maintained at a given target temperature (or range of temperatures) and enclosing a vapor of one or more atomic species. In accordance with some embodiments, the vapor may include one or more alkali metals, such as, for example, potassium (K), rubidium-85 isotope ($^{85}$Ru), rubidium-87 isotope ($^{87}$Ru), and/or cesium (Cs). If beam 200 includes wavelength(s) that are close to a transition in vapor cell 400, beam 200 may interact with the vapor, causing a reduction in its effective density. This reduction may occur due to one or more physics processes such as, for example, a quantum coherence between the atom's ground state and excited state. The reduction in the effective density may be most significant in regions 410 where beam 200 is most intense, thereby causing the vapor's effective index of refraction to tend closer to unity, while the reduction in the effective density may be less significant in regions 420, 430 where beam 200 is less intense, thereby causing the effective index of refraction to be closer to its unperturbed value further from unity. For rays of beam 200 passing through regions 440, 450 where the effective index of refraction has a significant gradient along the fast-axis direction, deflections may occur towards the direction with higher index of refraction. For wavelengths longer than the transition wavelength (e.g., redder), the index of refraction of the vapor is greater than unity, and rays are deflected outward (e.g., defocused). For wavelengths shorter than the transition wavelength (e.g., bluer), the index of refraction is less than unity, and rays are deflected inward (e.g., focused).

After passing through vapor cell 400, the deflected and undeflected rays of beam 200 reach a surface 500 that is at least partially reflective (e.g., a mirror or other suitable reflective surface) that is not perpendicular to the initial optical axis. The angle of reflective surface 500 can be chosen so that undeflected rays of beam 200 are not returned along paths to diode laser source 100. A single choice of this angle may select (a) at least one ray 240 from beam 200 that has a wavelength longer than the transition wavelength and/or (b) at least one ray 250 that has a wavelength shorter than the transition wavelength. The paths of these rays 240, 250 can be traversed in reverse, back to diode laser source 100, providing a mechanism for feedback only for those two selected wavelengths. With the gain increased for these two wavelengths only, the energy of diode laser source 100 may become fully converted into a beam 200 that is a mixture of wavelengths near the transition wavelength.

In accordance with some embodiments, system 10 may include at least one diode laser source 100 configured for generating at least one beam 200. System 10 also may include at least one reflective surface 500 arranged to form, in conjunction with the at least one diode laser source 100, an external cavity of system 10. System 10 further may include at least one vapor cell 400 disposed within the external cavity between the at least one diode laser source 100 and the at least one reflective surface 500. In operation of system 10, at least a first portion of beam power of the at least one beam 200 may be reflected from the at least one reflective surface 500 and again may be passed through the at least one vapor cell 400. Additionally, deflection of the at least one beam passing through the at least one vapor cell 400 may serve to select one or more preferred wavelengths 240, 250 in the external cavity. In accordance with some embodiments, the first portion of beam power further may be directed back towards the at least one diode laser source 100.

In some embodiments, the least one diode laser source 100 may include at least one multi-mode diode laser source. In some embodiments, the least one diode laser source 100 may include at least one diode laser bar. In some embodiments, the least one diode laser source 100 may include at least one diode laser bar stack. In some such instances, the at least one diode laser bar stack may include a plurality of diode laser bar stacks.

In some embodiments, the at least one diode laser source 100 may include a plurality of diode laser sources. In some instances, the plurality of diode laser sources may be staggered such that beams emitted thereby all remain in focus. In some instances, the plurality of diode laser sources 100 may be multiplexed into the external cavity.

In some embodiments, the at least one diode laser source 100 may include an end diode laser source configured to originate an idler beam, wherein at least one of the at least one diode laser source 100 may be configured to originate an output-coupled beam. In some cases, system 10 further may include at least one beam splitter configured to (a) provide a portion of beam power from respective beams originated by the end diode laser source and the at least one diode laser source 100 configured to originate the output-coupled beam, respectively, into the external cavity and (b) provide a portion of beam power originating from the at least one diode laser source 100 configured to originate the output-coupled beam as an output beam.

In some embodiments, the at least one vapor cell 400 may contain a vapor of at least one alkali metal species. In some embodiments, the at least one vapor cell 400 may contain an isotopic admixture of alkali vapor. In some embodiments, the at least one vapor cell 400 may include a plurality of vapor cells, each including a different isotopic admixture of alkali vapor.

In accordance with some embodiments, in being passed through the at least one vapor cell 400, the at least one beam may undergo refraction, causing a deflection of light rays. In some instances, the deflection of light rays may be wavelength-dependent.

In accordance with some embodiments, the at least one vapor cell 400 may be immersed in a magnetic field, the strength of which may be customized, as desired.

In accordance with some embodiments, the at least one reflective surface 500 may be configured to transmit at least a second portion of beam power of the at least one beam, thereby providing system 10 with an output beam. In some embodiments, the at least one reflective surface 500 may be adjustable in orientation. In some embodiments, the at least one reflective surface 500 may be configured such that orientation thereof selects a preferred optical path for the at least one beam. In some embodiments, the at least one reflective surface 500 may have a reflectivity value of about 97% or higher (e.g., about 98% or higher, about 99% or higher, or any other sub-range in the range of about 97% or higher).

Figure 5:
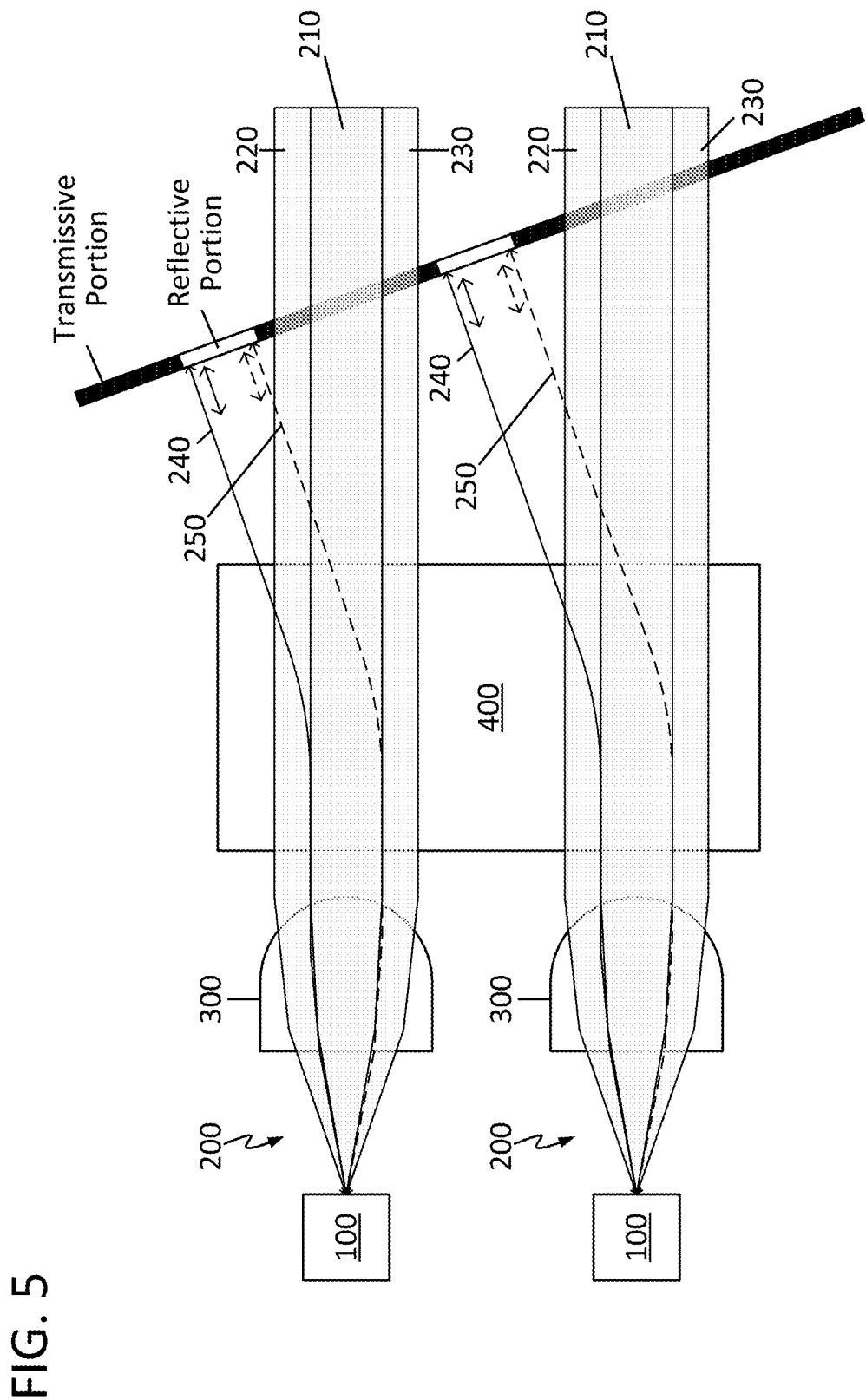
FIG. 5 is a schematic diagram of a diode laser system configured in accordance with another embodiment of the present disclosure.

In accordance with some embodiments, the at least one reflective surface 500 may be patterned with a series of stripes including (a) one or more stripes of greater or full reflectivity and (b) one or more stripes of lesser or no reflectivity. For instance, consider FIG. 5, which is a schematic diagram of a diode laser system configured in accordance with another embodiment of the present disclosure. In some embodiments, the at least one reflective surface 500 may include one or more reflective portions having one or more surface orientations that form one or more external cavities with the at least one diode laser source 100.

In accordance with some embodiments, system 10 may include at least one lens 300 disposed within the external cavity between the at least one diode laser source 100 and the at least one reflective surface 500, wherein the at least one lens 300 may be configured to focus the at least one beam along at least one dimension (e.g., the fast axis and/or the slow axis). In accordance with some embodiments, the at least one lens 300 may be (or otherwise may include) at least one collimating lens.

Figure 6:
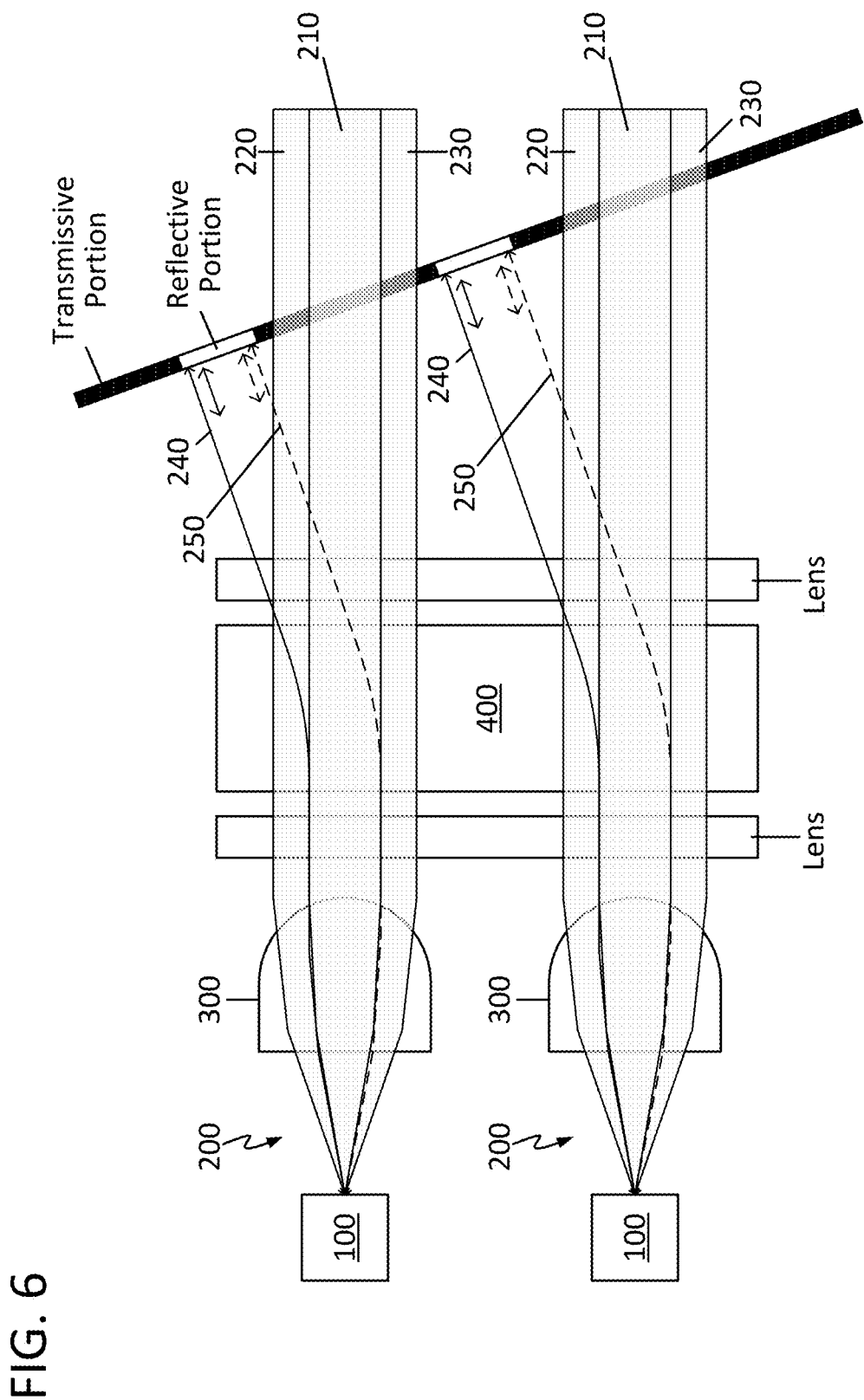
FIG. 6 is a schematic diagram of a diode laser system configured in accordance with another embodiment of the present disclosure.
Figure 7:
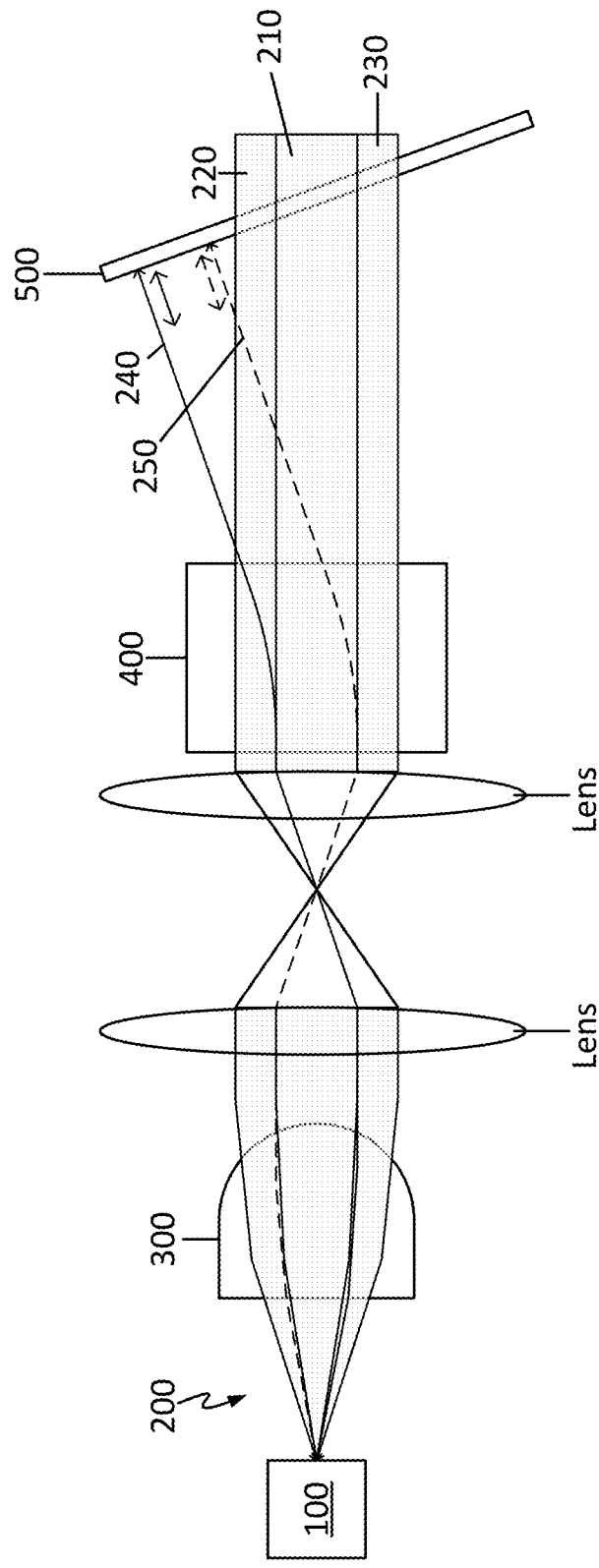
FIG. 7 is a schematic diagram of a diode laser system configured in accordance with another embodiment of the present disclosure.

In accordance with some embodiments, system 10 may include an afocal telescope disposed within the external cavity between the at least one diode laser source 100 and the at least one reflective surface 500, wherein the afocal telescope may be configured to image the at least one beam along at least one dimension at reflective surface 500. In some embodiments, the afocal telescope may be configured to image the at least one dimension of the at least one beam at reflective surface 500 after passing through the at least one vapor cell 400 such that deflection in the at least one vapor cell 400 serves to favor one or more wavelengths over other wavelengths in the external cavity. For instance, consider FIG. 6, which is a schematic diagram of a diode laser system configured in accordance with another embodiment of the present disclosure. As can be seen from FIG. 6, a cylindrical afocal telescope with lenses positioned between (e.g., at one-quarter and three-quarters the distance from) the at least one diode laser source 100 and the at least one reflective surface 500 is provided. This arrangement may image rays along the slow axis direction. Reflected rays, also imaged, may be more fully returned to their source emitter. Also, consider FIG. 7, which is a schematic diagram of a diode laser system configured in accordance with another embodiment of the present disclosure. As can be seen from FIG. 7, a spherical afocal telescope may image rays along both the fast axis and the slow axis directions. Reflected rays, also imaged, may be more fully returned to their source emitter.

In accordance with some embodiments, system 10 may be configured as a high-power diode laser system which includes at least one multi-mode diode laser emitter (e.g., source 100) configured for generating at least one beam propagating along an initial optical path. System 10 also may include at least one reflective surface 500 whose orientation is not perpendicular to the initial optical path. System 10 further may include at least one vapor cell 300 located within an external cavity of system 10 between the at least one multi-mode diode laser emitter and the at least one reflective surface 500. In such system 10, a gradient in an effective index of refraction of the vapor may arise due to passage of the at least one beam through the at least one vapor cell 400. Also, at least some rays constituting some power of the at least one beam may be deflected in the gradient. Furthermore, the at least some rays so deflected may impinge along a path perpendicular to the at least one reflective surface 500 and, upon reflection, may be fed back through the at least one vapor cell 400 along a bent path to the at least one multi-mode diode laser emitter. System 10 thereby may allow for a range of preferred wavelengths to be selected by the external cavity for amplification by the at least one multi-mode diode laser emitter.

Methodology

FIG. 8 is a flow diagram illustrating a method 1000 of diode laser wavelength spectrum narrowing in accordance with an embodiment of the present disclosure. As can be seen, method 1000 may begin, as in block 1002, with emitting a light beam. The light beam may be emitted, for example, via a diode laser source 100.

Method 1000 may continue, as in block 1004, with collimating the light beam. The light beam may be collimated, for example, via a lens 300.

Method 1000 may continue, as in block 1006, with transmitting the collimated light beam through a vapor (e.g., in a vapor cell 400), whereby at least one light ray 240, 250 may be deflected out of parallel flight in the collimated light beam 200.

Method 1000 may continue, as in block 1008, with reflecting the at least one deflected light ray 240, 250. Reflection may be provided, for example, via a reflective surface 500 that is at least partially reflective (e.g., having a reflectivity of at least 97%).

In some cases, method 1000 optionally may continue, as in block 1010, with transmitting at least a portion of the light beam as an output beam. Transmission may occur through (a) reflective surface 500 (e.g., which may be at least partially reflective and/or (b) a power divider disposed, for instance, between lens 300 and vapor cell 400.

Method 1000 may continue, as in block 1012, with transmitting the at least one reflected light ray 240, 250 through the vapor (e.g., in vapor cell 400).

Method 1000 may continue, as in block 1014, with returning the at least one deflected light ray 240, 250 to the source (e.g., diode laser source 100) of the light beam. Return may be provided, for example, via lens 300.

In accordance with some embodiments, a method for wavelength-locking and spectral narrowing a high-power diode laser may be provided using techniques disclosed herein. The method may include: (a) generating at least one beam propagating along an initial optical path; (b) positioning at least one reflective surface 500 along a path of the at least one beam and orienting the at least one reflective surface 500 in a direction that is not perpendicular to the initial optical path; (c) disposing at least one vapor cell 400 within an external cavity between at least one diode laser source 100 and the at least one reflective surface 500 so that the at least one beam passes therethrough; (d) producing gradients in an effective index of refraction of the vapor, which arise according to spatial variations in intensity of the at least one beam; (e) deflecting, in one or more of the gradients, at least some rays 240, 250 constituting some power of the at least one beam; (f) orienting the at least one reflective surface 500 perpendicular to at least one of the at least some deflected rays 240, 250; (g) reflecting one or more of the at least some deflected rays 240, 250 back through the at least one vapor cell 400 along an original bent path to return to the at least one diode laser source 100; and (h) causing one or more preferred wavelengths 240, 250 to be selected by the external cavity for amplification by the at least one diode laser source 100.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A diode laser system comprising:
   at least one diode laser source configured for generating at least one beam;
   at least one reflective surface arranged to form, in conjunction with the at least one diode laser source, an external cavity of the system; and
   at least one vapor cell disposed within the external cavity between the at least one diode laser source and the at least one reflective surface;
   wherein, in operation of the system:
      at least a first portion of beam power of the at least one beam is reflected from the at least one reflective surface and again passed through the at least one vapor cell; and
      deflection of the at least one beam passing through the at least one vapor cell serves to select one or more preferred wavelengths in the external cavity.

2. The system of claim 1, wherein the first portion of beam power further is directed back towards the at least one diode laser source.

3. The system of claim 1, wherein the at least one diode laser source comprises at least one of:
   at least one multi-mode diode laser source;
   at least one diode laser bar;
   at least one diode laser bar stack; and
   a plurality of diode laser sources.

4. The system of claim 3, wherein at least one of:
   the at least one diode laser bar stack comprises a plurality of diode laser bar stacks;
   the plurality of diode laser sources is staggered such that beams emitted thereby all remain in focus; and
   the plurality of diode laser sources is multiplexed into the external cavity.

5. The system of claim 1, wherein the at least one diode laser source comprises an end diode laser source configured to originate an idler beam, wherein at least one of the at least one diode laser source is configured to originate an output-coupled beam.

6. The system of claim 5, further comprising at least one beam splitter configured to:
provide a portion of beam power from respective beams originated by the end diode laser source and the at least one diode laser source configured to originate the output-coupled beam, respectively, into the external cavity; and
provide a portion of beam power originating from the at least one diode laser source configured to originate the output-coupled beam as an output beam.

7. The system of claim 1, wherein at least one of:
the at least one vapor cell contains at least one of:
a vapor of at least one alkali metal species; and
an isotopic admixture of alkali vapor; and
in being passed through the at least one vapor cell, the at least one beam undergoes refraction, causing a deflection of light rays, wherein the deflection of light rays is wavelength-dependent.

8. The system of claim 1, wherein the at least one reflective surface is at least one of:
configured to transmit at least a second portion of beam power of the at least one beam, thereby providing the system with an output beam; and
configured such that orientation thereof selects a preferred optical path for the at least one beam.

9. The system of claim 1, wherein the at least one reflective surface is patterned with a series of stripes comprising:
one or more stripes of greater or full reflectivity; and
one or more stripes of lesser or no reflectivity.

10. The system of claim 1, further comprising at least one of:
at least one lens disposed within the external cavity between the at least one diode laser source and the at least one reflective surface, wherein the at least one lens is configured to focus the at least one beam along at least one dimension; and
an afocal telescope disposed within the external cavity between the at least one diode laser source and the at least one reflective surface, wherein the afocal telescope is configured to image the at least one beam along at least one dimension at the reflective surface.

11. The system of claim 10, wherein the afocal telescope is configured to image the at least one dimension of the at least one beam at the reflective surface after passing through the at least one vapor cell such that deflection in the at least one vapor cell serves to favor one or more wavelengths over other wavelengths in the external cavity.

12. The system of claim 1, wherein in operation of the system:
the at least one beam generated by the at least one diode laser source propagates along an initial optical path; and
deflection of the at least one beam results in the at least a first portion of beam power propagating along an optical path which diverges from the initial optical path.

13. The system of claim 1, wherein deflection of the at least one beam results in the at least a first portion of beam power propagating along an optical pathway which diverges from an initial optical axis of the at least one beam generated by the at least one beam source.

14. The system of claim 13, wherein the at least one reflective surface is aligned non-perpendicular to the initial optical axis.

15. The system of claim 14, wherein the at least one reflective surface is aligned perpendicular to the optical pathway of the at least a first portion of beam power.

16. The system of claim 1, wherein the at least one reflective surface is aligned:
non-perpendicular to an initial optical axis of the at least one beam generated by the at least one diode laser source; and
perpendicular to an optical path of the at least a first portion of beam power deflected away from the initial optical axis while passing through the at least one vapor cell.

17. A method comprising:
emitting a beam;
collimating the beam;
transmitting the collimated beam through a vapor, whereby at least one light ray is deflected out of the collimated beam;
reflecting the at least one deflected light ray;
transmitting the at least one reflected light ray through the vapor; and
returning the at least one deflected light ray to a source of the beam.

18. The method of claim 17, wherein returning the at least one deflected light ray to the source of the beam involves passing the at least one deflected light ray through a collimating lens utilized in collimating the beam.

19. The method of claim 17, wherein transmitting the at least one reflected light ray through the vapor involves passing the at least one reflected light ray through a vapor cell containing the vapor utilized in transmitting the collimated beam.

20. The method of claim 17, further comprising:
transmitting at least a portion of the beam as an output beam.

* * * * *